July 19, 1955     H. A. DREW     2,713,426
COLLAPSIBLE TUBE TRANSFER MECHANISM
Filed Feb. 24, 1951     5 Sheets-Sheet 1
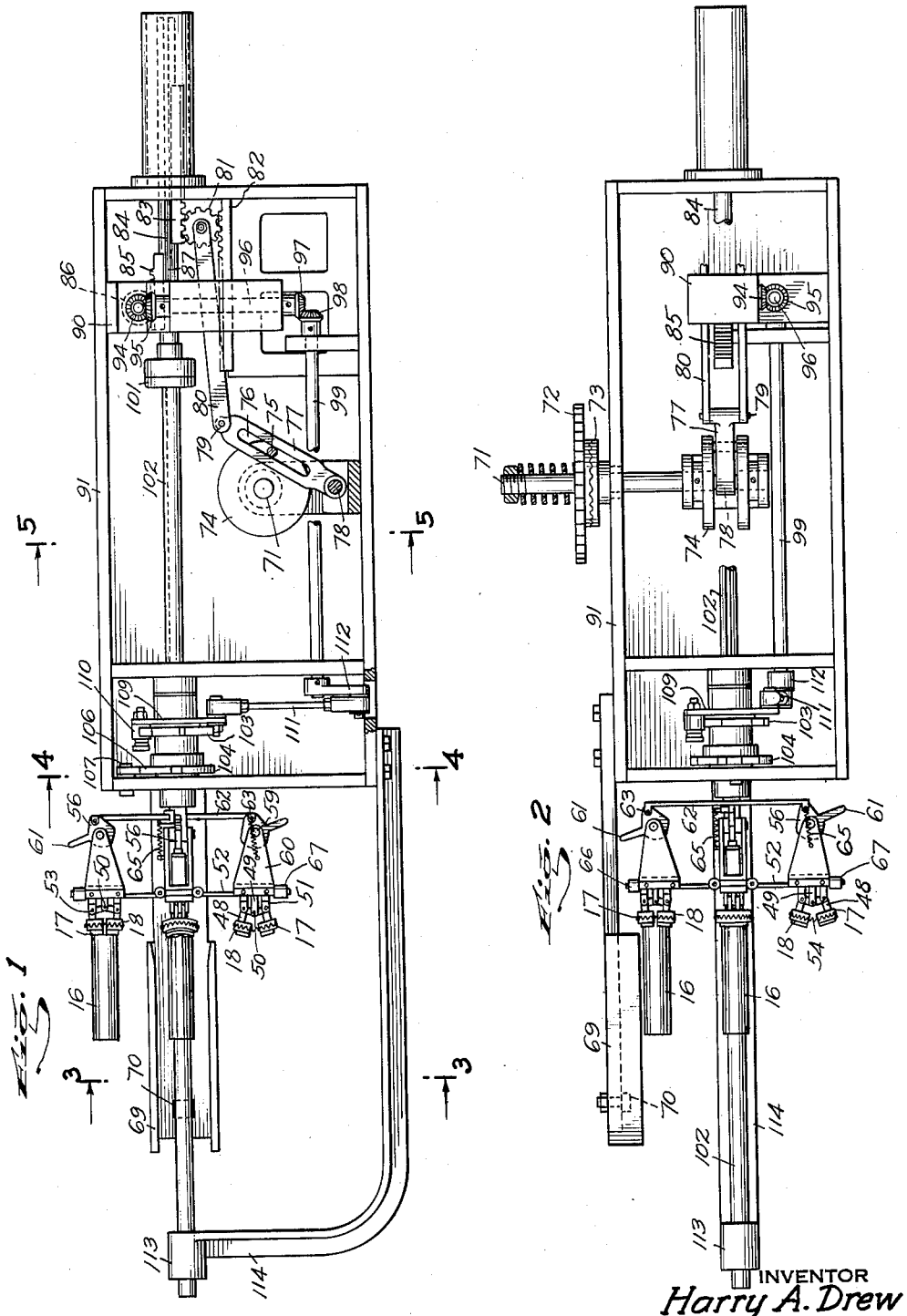
INVENTOR
*Harry A. Drew*
BY
ATTORNEY July 19, 1955  H. A. DREW  2,713,426
COLLAPSIBLE TUBE TRANSFER MECHANISM
Filed Feb. 24, 1951  5 Sheets-Sheet 2
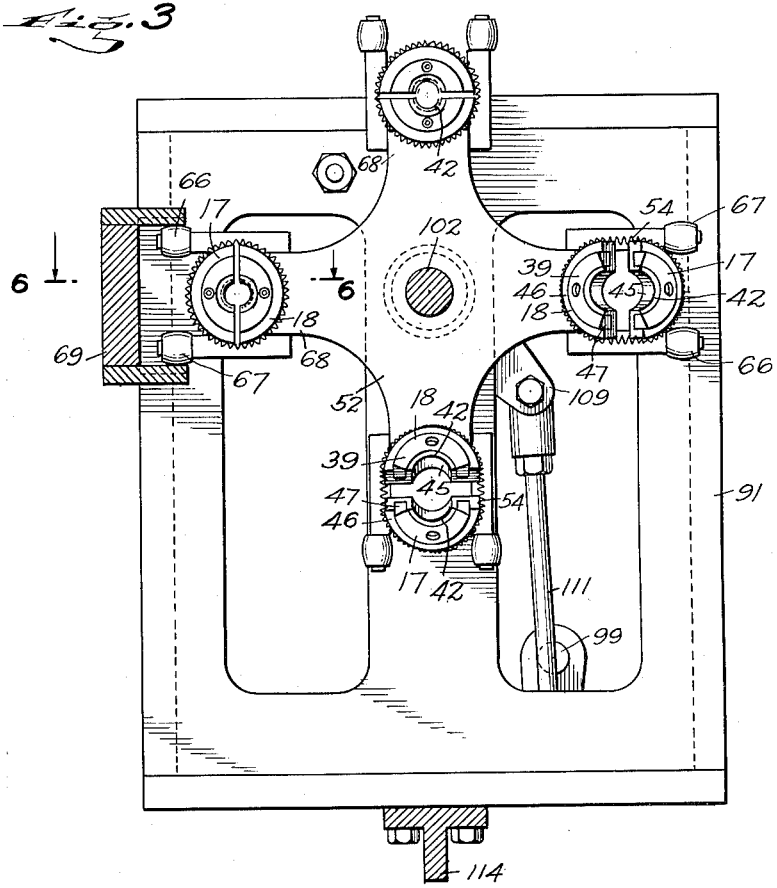
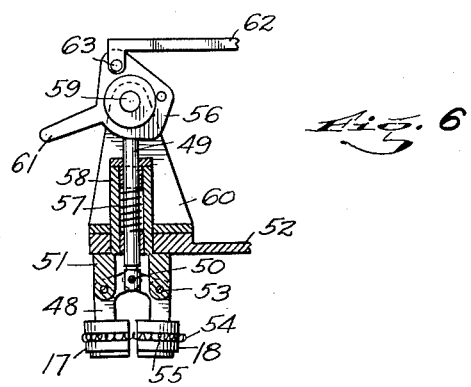
INVENTOR
Harry A. Drew
BY
Harry Jacobson
ATTORNEY July 19, 1955   H. A. DREW   2,713,426
COLLAPSIBLE TUBE TRANSFER MECHANISM
Filed Feb. 24, 1951   5 Sheets-Sheet 3
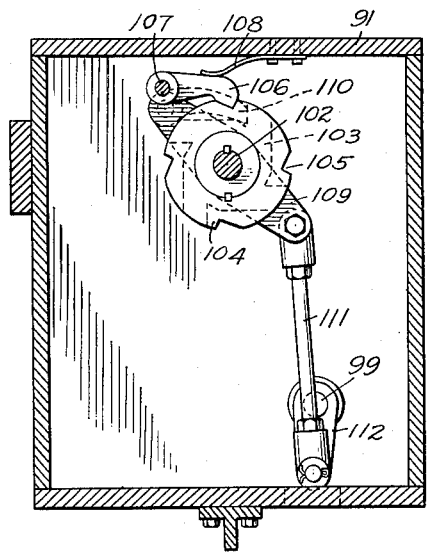
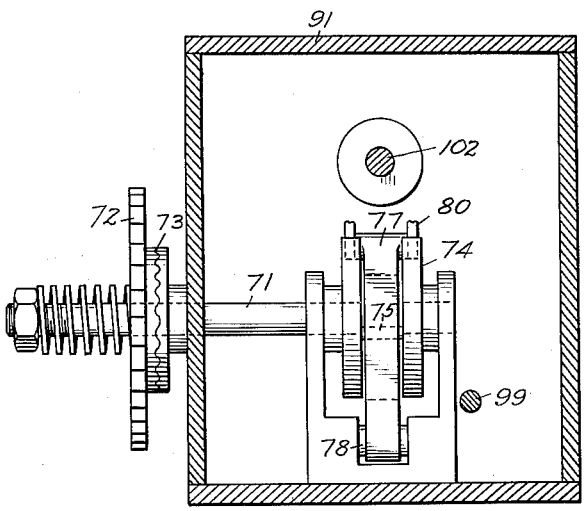
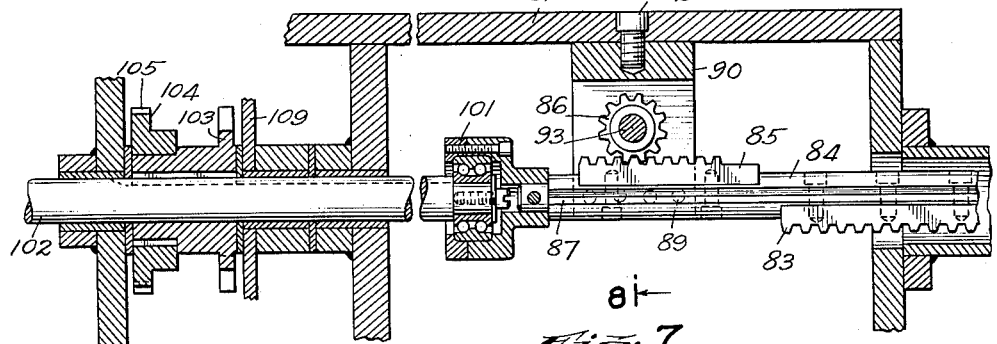
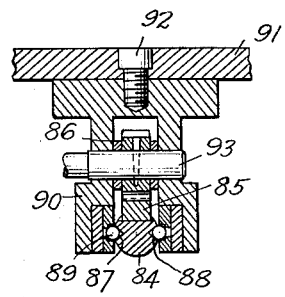
INVENTOR
Harry A. Drew
BY
ATTORNEY July 19, 1955   H. A. DREW   2,713,426
COLLAPSIBLE TUBE TRANSFER MECHANISM
Filed Feb. 24, 1951   5 Sheets-Sheet 4
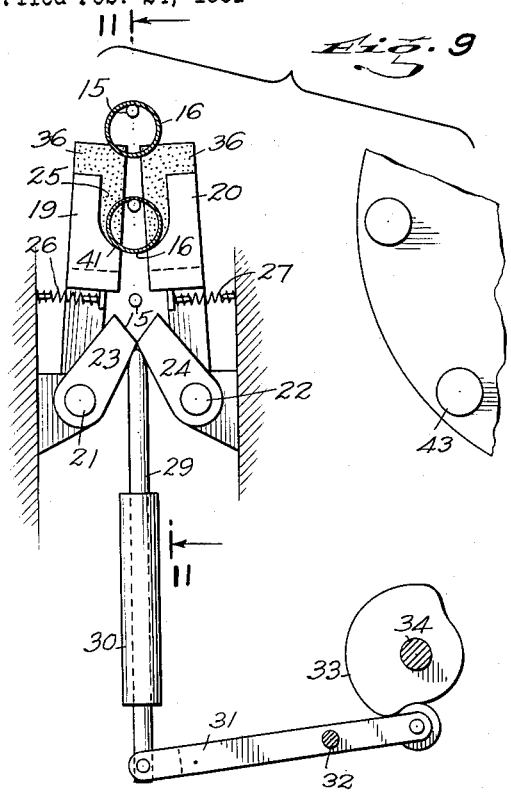
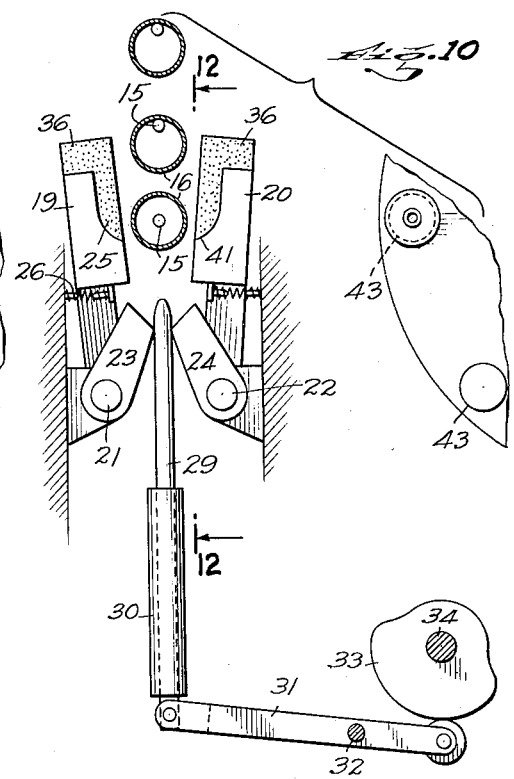
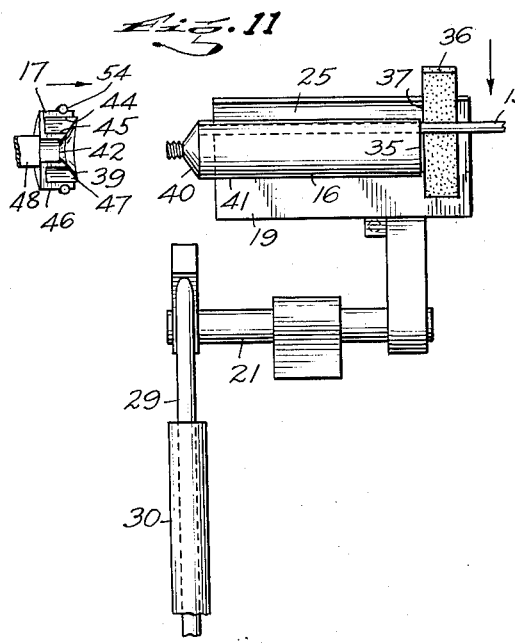
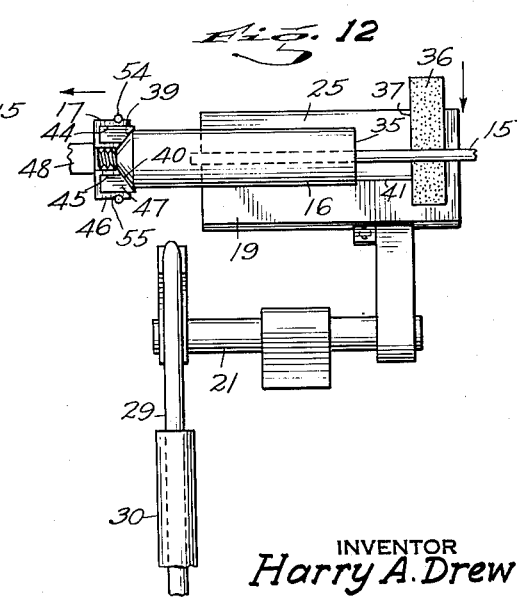
INVENTOR
*Harry A. Drew*
BY
*Harry Jacobson*
ATTORNEY July 19, 1955   H. A. DREW   2,713,426
COLLAPSIBLE TUBE TRANSFER MECHANISM
Filed Feb. 24, 1951   5 Sheets-Sheet 5
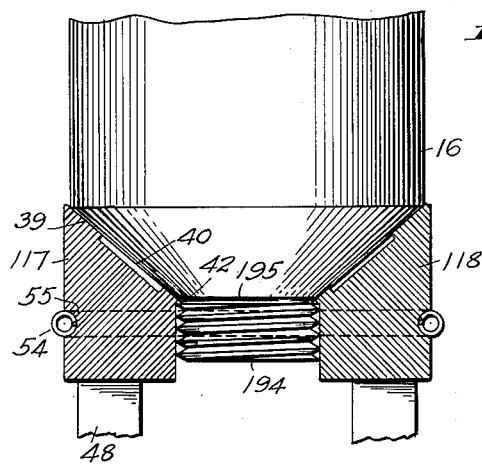
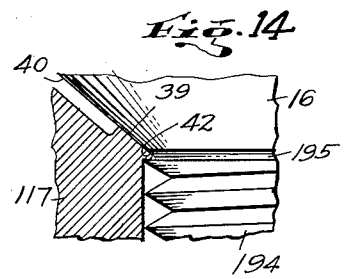
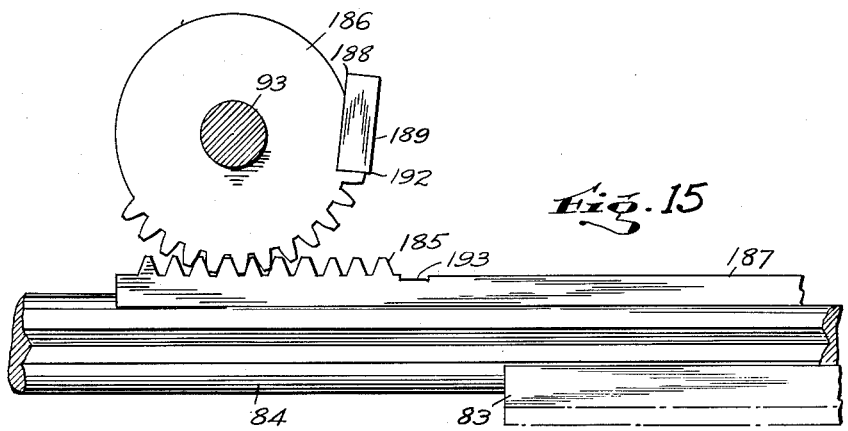
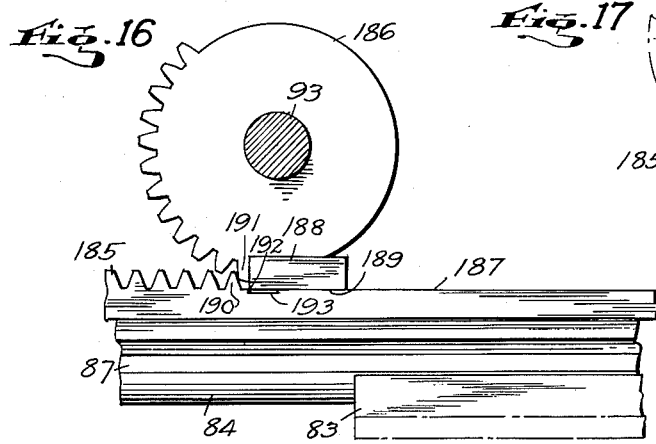
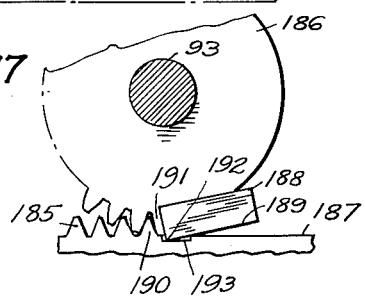
INVENTOR.
Harry A. Drew
BY
ATTORNEY United States Patent Office 2,713,426
Patented July 19, 1955

2,713,426

COLLAPSIBLE TUBE TRANSFER MECHANISM

Harry A. Drew, West New York, N. J., assignor to Victor Industries Corporation, Brooklyn, N. Y., a corporation of New York Application February 24, 1951, Serial No. 212,555

10 Claims. (Cl. 214—1)

This invention relates to mechanism for transferring relatively fragile articles such as metallic collapsible tubes from one mechanism to another and particularly to the means for removing a tube from a conveyor and mounting it on a mandrel for further operation thereon, or for removing it from a mandrel and mounting it on the pin of a conveyor.

The present invention contemplates the provision of dependable and efficient means operable at the relatively high speed at which enamelling and printing of collapsible tubes is usually done, for removing tubes from the tube-carrying pins of a continuously moving conveyor while retaining a firm grip on the tube, and transferring the tube firmly gripped and under full control to the mandrel of a suitable machine, or vice versa, to remove the tube from the mandrel of a machine while the mandrel is at rest and to mount the tube on the moving conveyor pin while retaining full control of the tube during the transfer, whereby a continuous processing and assembly line such as includes enamelling, printing, lacquering and capping steps is made possible.

The invention further contemplates the provision of means for releasably supporting a tube mounted on the moving conveyor pin just prior to the time that the tube is gripped by the transfer mechanism and insuring that the tube is properly gripped and in the proper position for re-mounting during the transfer thereof.

The invention further contemplates the provision of means for effectively gripping a tube at the base of the threaded neck thereof without injuring the fragile screw threads and maintaining the tube in its proper horizontal position during the transfer thereof to insure the mounting of the tube without injury thereto and without sliding the tube on any supporting surface such as might injure any coating thereon.

The invention further contemplates the provision of compact mechanism for dismounting the tube horizontally through a distance greater than the length of the tube and in the direction of the tube axis, then to move the tube transversely and finally to move it back bodily in a mounting direction opposite to the first dismounting movement thereby to clear the supports, or to move the tube transversely during the first part of the mounting movement, and during the remainder of such movement to hold it accurately in the precise position required.

The various objects of the invention will be clear from the description which follows and from the drawings, in which:

Fig. 1 is an elevational view of the tube transfer mechanism.

Fig. 2 is a top plan view thereof.

Fig. 3 is an enlarged end elevational view thereof.

Fig. 4 is a vertical sectional view thereof taken on the line 4—4 of Fig. 1.

Fig. 5 is a similar sectional view taken on the line 5—5 of Fig. 1.

Fig. 6 is a horizontal sectional view of the tube-gripping jaws and of the operating mechanism therefor taken on the line 6—6 of Fig. 3.

Fig. 7 is a fragmentary vertical sectional view of the longitudinally movable and rotatable shaft carrying the gripping jaws and of part of the operating mechanism therefor.

Fig. 8 is a vertical sectional view taken on the line 8—8 of Fig. 7.

Fig. 9 is an elevational view of the means for temporarily supporting a tube on a moving conveyor pin just prior to the dismounting of the tube.

Fig. 10 is a similar view of the same in the positions assumed thereby during the dismounting operation.

Fig. 11 is a vertical sectional view of the same taken on the line 11—11 of Fig. 9 and showing one of the tube-gripping jaws while the jaw advances toward the tube neck.

Fig. 12 is a similar view of the same, showing the jaw after the tube neck has been gripped, the section being taken on the line 12—12 of Fig. 10.

Fig. 13 is a horizontal sectional view of a modified form of the gripping jaws as they appear when gripping a tube.

Fig. 14 is a fragmentary similar on an enlarged scale, showing particularly the edged tooth entering a groove in the tube neck at the base of the threads.

Fig. 15 is a fragmentary elevational view of the means for insuring engagement of the teeth of the rack and pinion which control rotation of the jaw-carrying frame during axial movement of said frame in either direction, the parts being shown in positions wherein movement in the tube-dismounting direction has been completed and movement in the tube-mounting direction as well as rotation of the jaw frame is about to begin.

Fig. 16 is a similar view of the same, the parts being shown in positions wherein rotation of the jaw frame has been completed and said frame locked against further rotation in the same direction, but axial sliding of the frame may continue without rotation of the frame, or the return movement of the operating parts for rotating the frame may occur without rotation of the frame.

Fig. 17 is a similar view of the same showing the parts in the positions wherein the pinion moves in one direction into the locking position of Fig. 16 or in the other direction out of said position.

For a clear understanding of the invention, it should be noted that the present invention forms a part of a production line involving special machines for the various operations to be performed upon collapsible tubes, and that the tubes are transferred by the transfer mechanism here involved from one machine to another through the intermediary of a suitable conveyor such as a sprocket chain or the like, not shown. Such chain has a series of spaced parallel transversely extending pins as 15 projecting therefrom at suitable intervals, the pins being long enough to enter into the interior of a collapsible tube as 16 through the open end of the tube and to support the tube in a well known manner. The transfer mechanisms forming the subject matter of this invention are arranged preferably in pairs at each machine. The machines in the production line may be, for example, an enamelling machine, a printing machine, a lacquering machine or the like and a cap-applying machine, though only one transfer mechanism is needed at the last machine in the line to mount a printed or otherwise coated tube on a mandrel of the last machine.

Discharge of the tube as from the cap-applying machine may if desired, be performed by suitable means other than the transfer mechanism because the finished tube need not be again mounted on a conveyor pin, or the final discharge of the tube may be accomplished by the transfer mechanism which in that case merely discharges the tube by releasing it. One mechanism removes the tube from a pin and mounts it on the mandrel of one machine while the other remounts it on another pin of the conveyor. Obviously, the machines may be spaced to provide for additional equipment between the machines, as for the passage of the conveyor and the tubes thereon through heating or drying chambers or the like. Since the mechanisms of each pair are substantially alike, the present description of the mechanism for dismounting the tube from a conveyor pin and mounting it on a mandrel will suffice also for that transferring the tube from a mandrel to a conveyor pin.

Referring now to Figs. 9 to 12, it will be noted that the conveyor pins 15 supporting the tubes 16 are shown as moving downwardly and continuously, though the direction of such movement is immaterial. The tube, however, should be temporarily supported in a stationary position to insure that the tube remains horizontal while and after it is gripped by a pair of the gripping jaws 17, 18 shown in Figs. 1–3 and 6. The means shown for accomplishing this purpose comprises the pivoted supports 19, 20 each fixed on a pivot shaft as 21, 22 supported by a fixed part of the machine and carrying the lugs 23 and 24 respectively fixed thereon. The upper part of each support is long enough to receive the tube 16 in the recess 25 thereof when the supports are in the innermost tube-supporting positions thereof shown in Fig. 9 wherein the lugs 23 and 24 are moved toward and into contact with each other by the compression springs 26, 27 acting on the respective supports. As shown, a tube 16 has just reached and is resting on the bottoms of the recesses 25 and the pin 15 in the tube is just about to move downwardly within and to the bottom edge part of the tube. At this time, as best seen in Fig. 11, the jaws 17, 18 move horizontally in the direction of the arrow toward the tube to engage the neck and shoulder parts thereof as seen in Fig. 12. As soon as the tube is properly gripped in a manner soon to be explained and while the conveyor pin continues to move transversely through the interior of the tube, the supports 19, 20 are separated and the gripping jaws are moved in the direction of the arrow of Fig. 12 to dismount the tube from the conveyor pin before said pin can strike the tube wall. The supports 19, 20 are preferably spread apart as shown in Figs. 10 and 12 before dismounting actually begins to avoid sliding the tube on the bottom of the recess 25 and possibly damaging its coating, by means of the reciprocating rod 29 slidably mounted in the fixed bearing 30 and reciprocated by the lever 31 pivoted at 32 and oscillated by the cam 33 on a suitable revoluble shaft 34 rotated in synchronism with the movement of the conveyor in any suitable manner.

Since the tubes may assume different longitudinal positions on the conveyor pins as they are advanced, it becomes advisable to provide means to insure that the open end 35 of the tube reaches a definite longitudinal position with respect to the pin and that the tube is properly supported when it is gripped preparatory to dismounting. As shown, said means comprises a sheet 36 of soft foam rubber arranged just beyond the open rear end of the tube and against the face of which said tube end is forced at the end of the mounting or rearward movement of the gripping jaws in the direction of the arrow of Fig. 11. Each support 19 and 20 carries a sheet 36 as in a suitable slot 37 thereof, the tube end 35 sinking into the rubber sheet as the jaws move into gripping position. The jaws are open as they approach the tube, but the inclined or conical surface 39 of the annular fiber or the like insert or half washer 40 of the tube just before the end of the gripping movement and pushes said shoulder and the tube rearwardly to force the end 35 into the sheet. The sheet resists such movement to only a slight extent but enough to hold the rear end of the tube securely against slipping or displacement while the jaws close, the tube being guided by and supported by the bottom supporting surface 41 of the recess 25 until the gripping operation is completed and then being supported at its front end by the conical surface 39. When the jaws close, the long edged tooth 42 provided just in front of the surface 39 of each jaw enters the tube neck just behind the screw thread thereon to position the tube accurately horizontally within the closed jaws ready for the reverse horizontal dismounting movement of the jaws.

After the tube neck has been firmly gripped by the jaws, the lugs 23, 24 are spread by the rod 29 and the tube freed of the supports 19, 20, whereupon the dismounting movement of the jaws is begun. Said movement withdraws the rear end of the tube from the sheets 36 and withdraws the tube from the pin 15 before said pin can move across the interior of the tube.

When the tube 16 is mounted on the mandrel 43 of one of the machines in the line, there is no danger that the tube may be incorrectly positioned, since the mandrel fits the inside of the tube snugly enough to prevent displacement. Hence the mandrels are arranged so that the tubes thereon are presented properly to the jaws and teeth 42 uniformly enter the tube necks to a slight extent at the correct points behind the screw threads preparatory to the dismounting operation from the mandrel when the tube is to be transferred from the machine back to the conveyor.

Each jaw as 17 and 18 is of generally hollow semi-cylindrical form having an annular semi-cylindrical slot 44 therein between its hub 45 and its rim 46, the hub being shorter than the rim so that the half washer 47 may be inserted into the slot with the conical surface 39 thereof unobstructed. An L-shaped arm 48 (Fig. 6) extends from the front of each jaw, the ends of the arms being pivoted together and pivoted to the rod 49 as at 50. Each of the arms is also pivoted to an extension 51 of the revoluble jaw-carrying frame 52 as at 53 to form a toggle joint whereby the jaws may be separated and closed by longitudinal movement of the rod 49.

The jaws are urged toward the closed positions thereof by the spring 54 in the circumferential grooves 55 around the jaws, said spring yielding when the rod 49 is moved rearwardly (or downwardly as viewed in Fig. 6) by the cam 56 which engages the front end of said rod, the rod being urged by the spring 57 within the rod bearing 58 into contact with the cam. Supporting the cam shaft 59 is the bracket 60 projecting forwardly of the jaw frame 52. As shown, said frame carries four sets of jaws 17, 18, said sets being identical and as above described. However, the diametrically opposed jaw sets are connected together in such a manner that when one set of jaws is closed, the opposite set is open and vice versa, whereby it becomes possible to dismount a tube from one pin or mandrel by means of one set of jaws and after two quarter turns of the frame 52, to mount the same tube on a different mandrel or pin while another dismounting operation is being performed by the opposite set of jaws.

To operate the jaw sets in unison, each toggle-operating cam 56 is provided with an integral arm 61 projecting therefrom and operated at the proper time to close one set of jaws, the cams of opposite sets being connected by the link 62 at the pivot points 63 near the ends of the link. A spring 65 between the pivot 63 and fixed point of the bracket 60 serves to maintain the cam in the position into which it is rotated through its arm 61. As best seen in Figs. 1 and 2, when the arm 61 has been operated to close one set of jaws, the spring 65 is moved by the cam on to one side of the cam shaft 59 and remains on that side while the arm 61 is moved in the opposite direction to the other side of said shaft. Such movement occurs when said arm 61 of the opposite set of jaws is actuated to close said opposite set and through the link 62 opens the set which was previously closed. The spring 65 stays on the other side of the shaft until an arm 61 and the link 62 are again operated.

As has been indicated, the entire jaw frame 52 is given a horizontal longitudinal stroke bodily as well as a quarter turn during the forward part of the complete stroke, and the means for so moving the frame will later be described. However, to guide the frame during its stroke and to operate the proper cam arm 61 at the proper time to open one set of jaws and to close the opposite set, a pair of spaced parallel rollers 66 and 67 is carried by each arm 68 of the frame 52, the rollers moving into and out of the fixed channel guide 69 interposed in their path and rolling on the inner faces of the flanges thereof (Fig. 3).

After the jaw frame has moved bodily rearwardly the required distance to carry one of the operative sets of jaws into position to grip the neck of the tube 16 on a conveyor pin 15 and into position to mount the tube carried by the opposite set of jaws on a mandrel 43, that is, at the rear end of the stroke of the jaw frame, the arm 61 of said opposite set of jaws strikes the stop 70 (Figs. 1 and 2) carried by the guide channel 69 and is rotated in a clockwise direction as viewed in Fig. 2 to open the jaws gripping the thus mounted tube and to close the other set upon the neck of the tube to be dismounted. The springs 65 maintain the jaw sets open or closed as the case may be while the jaw frame moves forwardly and dismounts the tube and also is rotated a quarter turn to carry the remaining two sets of jaws into operative position. On the rearward or reverse stroke of the frame toward the mandrel, the jaw frame is not rotated.

As shown in Figs. 1 and 2, the jaw frame has completed its forward or tube-dismounting stroke and has been rotated the quarter turn to carry the dismounted tube to the top station of the frame and to carry the previously dismounted tube to the left hand station as viewed in Fig. 3. Hence the sets of jaws carrying the dismounted tubes are closed and the opposite sets are open. On the rearward or mounting stroke toward the conveyor pins or mandrels, the tube at the left station is mounted on a pin or mandrel and the set of jaws at that station opened, thereby to close the open jaws at the right hand station around the neck of a tube on a pin or mandrel. On the next forward stroke, the tube gripped at the right hand station is dismounted, and at the end part of the stroke, the jaw frame is given its quarter turn to carry the dismounted tube from the right hand station to the top station and also to carry the tube formerly at the top to the left hand station ready to repeat the operation.

The means for giving the jaw frame its horizontal strokes and its intermittent rotary movement comprises the drive shaft 71 (Figs. 1, 2 and 5) continuously rotated through any suitable means such as the sprocket wheel 72 and the clutch 73. The crank disc 74 on the drive shaft through the pin 75 thereon and entering the slot 76 in the lever 77, oscillates said lever which is pivoted at its lower end 78. At its upper end the lever is pivoted to one end 79 of the pinion-carrying levers 80. Said levers 80 carry the rotatable pinion 81 meshing with the lower fixed rack 82 and also with the longitudinally movable rack 83 secured to the sliding rod 84 which also carries a third shorter rack 85 meshing with a second pinion 86, the second pinion being part of the mechanism for rotating the jaw frame. For supporting the rod 84 and preventing rotation thereof during its relatively long stroke, said rod is grooved longitudinally along diametrically opposite lines as 87, 88 therein (Fig. 8) to receive portions of the guiding and holding balls 89, the opposite portions of said balls being retained and rolling in suitable grooves in the bracket 90 secured to the machine frame 91 as by the screw 92. The jaw-frame-rotating pinion 86 is fixed to the shaft 93 rotatably supported by the bracket 90 and carrying the bevel gear 94 (Fig. 1) meshing with the bevel gear 95 at one end of the upright shaft 96, the other end of which carries the bevel gear 97 meshing with the bevel gear 98 on the shaft 99.

It will be seen that the reciprocatory stroke imparted to the rod 84 by the racks 82 and 83 and pinion 81 is about twice the length of the stroke of said pinion, this being an important feature in view of the long distance through which the frame must move to dismount a long tube, and resulting in a compact instead of a large and relatively complicated and unwieldy mechanism difficult to guide and support with the accuracy needed. The rod 84 is also supported at its left end as viewed in Fig. 7 by the coupling 101, which also rotatably supports the adjacent end of the jaw frame shaft 102 in alignment with the rod 84 for reciprocation as a unit therewith. Suitable operative connections between the shafts 102 and 99 insure proper intermittent rotation of the jaw frame on the oscillation of the pinion 86, which occurs when the rod and the rack 85 are reciprocated. On the shaft 102 are fixed the four-toothed ratchet wheel 103 and the locking ratchet wheel 104 (Figs. 2, 4 and 7), the notches 105 of the latter being successively engaged by the retaining pawl 106 pivoted to the frame 91 as at 107 and pressed by the spring 108 toward the notches 105 and thereby maintaining the shaft 102 against undesired movement.

To convert the oscillatory movement of the shaft 99 to intermittent quarter turns of the ratchet wheel 103 and of the shaft 102 as above described, the pawl-lever 109 is fixed to the shaft 102 and carries at one end thereof the pawl 110 suitably spring-pressed against the periphery of the ratchet wheel 103. At its other end, the lever 109 is pivoted to the connecting rod 111, the lower end of which is in turn pivoted to the crank 112 on the oscillating shaft 99. It will be noted that the shaft 102 is extended so that its front end is properly supported as by the bearing 113 in the supporting arm 114 secured to the frame 91 (Figs. 1 and 2).

In operation, the sprocket wheel 72 being driven and the clutch 73 being engaged, consequent rotation of the crank 74 oscillates the lever 77 and through the link 80 reciprocates the pinion 81 while said pinion remains meshed with the racks 82 and 83. Said rack 83 together with the rod 84 and rack 85 thereon and the aligned shaft 102 are consequently reciprocated as a unit through a relatively long stroke sufficient to mount and to dismount the tubes 16 on and from the continuously moving conveyor pins 15 and the intermittently moving mandrels 43. The shaft 102 is rotated preferably through a quarter turn near the end of each dismounting or forward stroke of said shaft by means of the rack 85 which being shorter than the racks 83 and 82 acts only during a part of the stroke. The rack 85 oscillates the pinion 86 and the shaft 99 and crank 112 through the operative connections therebetween. In turn, the crank 112 through the connecting rod 11 and ratchet wheel 103, pawl lever 109 and pawl 110 oscillate the shaft 102. On each movement of the shaft 102, the tube just dismounted from a pin or mandrel is moved to a station between the mounting and dismounting stations, while a set of open jaws is moved to the dismounting station and an opposite set of jaws, closed on a tube, is brought to the mounting station, the fourth set of jaws being inoperative and open (Fig. 3) at a lower station between the dismounting and the mounting stations.

On the rearward or mounting stroke of the shaft 102, a tube is held by the closed set of jaws at the mounting station and is mounted on the mandrel or pin while the opposite set of open jaws is arranged about the neck of a tube on a pin or mandrel. When the shaft 102 reaches the end of its stroke, the cam arm 61 strikes the stop 70 and opens the tube-holding and mounting set of jaws to release the mounted tube and simultaneously closes the opposite open set of jaws around the tube neck as hereinbefore described in detail. The surface 39 holds the tube horizontal and against shifting or displacement in the jaws. If the tube to be dismounted is suspended on a pin 15, the jaws push the tube rearwardly into a predetermined dismounting position in which the rear end 35 of the tube sinks into the foam rubber sheet 36 to the necessary extent and is there held, the tube resting on the bottom of the recess 25 of the tube supports 19, 20. Before the return stroke of the shaft 102 and of the jaw frame, the tube supports 19, 20 are spread apart by the rod 29 so that the tube is held only by the jaws. Before the moving pin 15 can reach the bottom edge of the interior of the tube, the forward dismounting stroke of the jaw frame 52 is begun and completed to dismount the tube. At the end of the stroke or at the beginning of the next stroke, the thus dismounted tube is advanced a quarter turn by the rotation of the frame as already fully explained.

It will be understood that the intermittent rotary movements of the jaw frame may be made to occur at a time other than at the end parts of the axial dismounting or forward movements of the frame. Advantageously, the speeds of the forward and rearward movements of the frame are not the same and the necessarily accurate mounting operation and rotation of the frame may well take place at the slower speed with good results. Such difference in speeds arises from the employment of the revoluble crank pin 75 (Figs. 1 and 5) operating in the slot of the lever 77. Obviously, when the pin 75 moves in the upper part of the slot 76, while the crank rotates in a counterclockwise direction as viewed in Fig. 1, said pin necessarily moves for a longer period to complete a movement or half oscillation of the lever 77, than when the pin moves in the lower part of the slot. Hence the shaft 102 and rod 84 move rearwardly or in a tube-mounting direction more slowly than in the dismounting or forwardly direction and precise and accurate mounting of the tube becomes easier.

In Figs. 15-17 are shown somewhat modified parts controlling the rotation of the jaw frame, said parts operating not only to rotate the frame at the beginning of the rearward, mounting or slow stroke of the frame, but also insuring re-engagement of the teeth of the pinion 186 with the teeth of the rack 185 after they have been disengaged, and also locking the jaw frame against undesired or backward rotation and preventing any lost motion or backlash in the train of mechanism from causing relative disarrangement of the rotation-controlling rack and pinion teeth. As shown in Figs. 15-17, the pinion 186 on the shaft 93 replaces the similar pinion 86 and serves the same and additional purposes. The teeth of said pinion engage the teeth of the rack 185, which is similar to the rack 85, only when it is desired to operate the ratchet wheel 103 or its pawl 110. The rack teeth leave the pinion teeth during the sliding movement of the jaw frame but without causing or permitting rotation of the frame or of the shaft 93 in either direction. For this purpose, teeth are provided only at the left hand end of the rack 185 as viewed in Figs. 15-17, the remainder of the rack having a flat smooth upper surface 187.

The block 188 is secured to the pinion 186 and has a flat outer surface 189 which is arranged to engage the surface 187 of the rack at the end of the frame-moving rotation of the shaft 93, as shown in Fig. 16. On such engagement, the shaft 93 becomes locked against continued rotation in the same direction (which is clockwise as viewed in Fig. 16) but the rod 84 may nevertheless slide bodily toward the left to complete the rearward or mounting stroke thereof and of the jaw frame shaft 102. Hence the position of the pinion 186 is maintained and on the return movement of the rod 84 and rack 185 toward the right, the last tooth 190 of the rack strikes the first tooth 191 of the pinion and properly engages said tooth as seen in Fig. 16. It will be noted that in this position of the block, the left end thereof is arranged to the left of the vertical center line through the pinion. As the return movement of the rack 185 continues, the pinion is caused to rotate in a counterclockwise direction, thereby carrying the lower left corner 192 of the block 188 into the shallow recess 193 in the top surface 187 of the rack and permitting the block to become unlocked and to leave the surface 187 as best seen in Fig. 17. Continued rotation of the pinion in the return direction merely causes retraction of the operating pawls 106 and 103 (Fig. 4) over their respective ratchet wheels and permits no rotation of the jaw frame until the parts reach the position of Fig. 15 wherein the rack and pinion teeth remain in mesh and insure proper rotation of the pinion and of the jaw frame on the next operative stroke.

It is advisable, to insure proper gripping of the tube neck by the jaws 17, 18 or 117, 118 of Figs. 13 and 14, to undercut the neck at the base of the screw threads 194, as shown at 195. The edged teeth 42, which extend circumferentially around the inner edge of each of the jaws, bites slightly into the undercut or groove thus formed and adequately and firmly grips the tube so that transfer thereof in the precise position required is assured.

It will be seen that a dependable compact tube-transfer mechanism has been provided hereby, that the mechanism is adapted for high speed operation in an automatic production line, that the tubes are adequately held and precisely transferred without danger of damage thereto and that there has been provided hereby a mechanism well designed to perform the purposes intended.

While certain specific embodiments of the invention have herein been shown and described to furnish an example of the application of the invention, various obvious changes may be made therein without departing from the spirit of the invention defined in the appended claims.

I claim:

1. In a mechanism for transferring a tube from a member engaging the interior of and supporting the tube to another member adapted to enter the interior of the tube, a rotatable jaw frame, a plurality of sets of spring-pressed jaws carried by said frame, connecting means between opposite sets of jaws to open one set of jaws when the opposite set is closed, means for intermittently rotating the jaw frame and means for reciprocating the jaw frame to dismount a tube from a member on one reciprocatory stroke of the frame and to mount a tube on another member on the stroke of the frame in the opposite direction, the frame rotating means being operative on one of said strokes.

2. The transfer mechanism of claim 1, and means to operate two opposite sets of jaws at the end of the tube-mounting stroke to close one set of jaws and to open the other set.

3. The transfer mechanism of claim 1, the connecting means for the sets of jaws comprising a cam having an operative connection to each set of jaws, a link connecting said cams and springs connected to the link and maintaining the cams, the link and the jaws in the respective position into which the cams, links and jaws are set.

4. The transfer mechanism of claim 1, means to close each set of jaws comprising a cam arm, a pivoted cam carrying the arm, operative connections between the cam and the jaws and a fixed stop in the path of the arm to engage and to swing the arm and thereby to open the jaws at the end of the tube-mounting stroke of the frame.

5. The transfer mechanism of claim 1, the means for reciprocating the frame comprising a fixed rack, a movable rack facing and parallel to the fixed rack, a pinion meshing with both racks, means for reciprocating the pinion, a rotatable shaft carrying the frame, a non-rotatable rod aligned with the shaft and carrying the movable rack and a coupling connecting the shaft and the rod for simultaneous reciprocation thereof as a unit.

6. The transfer mechanism of claim 5, the means for rotating the frame comprising a third rack carried by the rod, a pinion oscillated by the third rack on reciprocation of the rod, a ratchet and pawl drive for the shaft and operative connections between the pinion and the pawl to oscillate the pawl on the oscillation of the pinion.

7. A transfer mechanism for a collapsible tube having a threaded neck and a conical shoulder beyond the neck, comprising a pair of jaws, each of the jaws being generally a hollow half cylinder and having an interior conical tube-supporting surface extending to the rear face of the jaw, a spring urging the jaws into closed position, an edged projection on each jaw at the smaller end of the conical surface adapted to enter the base of the threaded neck of the tube when the jaws are closed and to support the tube with the shoulder thereof engaged by the conical surface, a toggle joint including a reciprocating rod for the jaws, a bracket supporting the joint and a cam pivoted to the bracket and in operative engagement with the rod.

8. The transfer mechanism of claim 7, a rotatable and reciprocatory jaw frame carrying the jaws, an additional pair of jaws on the frame opposite the first mentioned pair, a similar toggle joint, bracket and cam for the additional pair of jaws, and means connecting the cams of the opposite pairs of jaws to move one pair of jaws into closed position when the other pair of jaws is moved into open position.

9. The transfer mechanism of claim 8, means for reciprocating the frame and means for rotating the frame through a predetermined angle progressively on each complete reciprocation of the frame.

10. In a tube transfer mechanism, a jaw frame carrying a plurality of pairs of jaws and means for intermittently rotating the frame including a ratchet wheel, a pawl operating the wheel and means for oscillating the pawl, said pawl-oscillating means comprising a reciprocating rack having a flat upper surface along part of the length thereof, pinion meshing with and being disengaged from the rack during the reciprocation of the rack and a block secured to the pinion in position to engage and slide on said flat upper surface when the pinion is disengaged from the rack, and operative connections between the pinion and the pawl.

References Cited in the file of this patent

UNITED STATES PATENTS

| | | |
|---|---|---|
| 1,058,193 | Mulholland | Apr. 8, 1913 |
| 1,786,608 | Halstead | Dec. 30, 1930 |
| 1,808,180 | Schroder | June 2, 1931 |
| 1,839,438 | Prussing | Jan. 5, 1932 |
| 1,868,373 | Terry | July 19, 1932 |
| 1,896,657 | Bacheller | Feb. 7, 1933 |
| 1,999,742 | Smith | Apr. 30, 1935 |
| 2,059,177 | Ohrn | Oct. 27, 1936 |
| 2,253,283 | Minaker | Aug. 19, 1941 |
| 2,325,919 | Porch | Aug. 3, 1943 |
| 2,415,997 | Eldred | Feb. 18, 1947 |
| 2,550,920 | Gilbert | May 1, 1951 |
| 2,610,746 | Steck | Sept. 16, 1952 |
| 2,623,649 | Rowe | Dec. 30, 1952 |